(12) United States Patent
Wolf

(10) Patent No.: US 12,245,584 B2
(45) Date of Patent: Mar. 11, 2025

(54) APPARATUS AND METHOD FOR PLANT REGULATION IN A CULTIVATED PLANT STOCK

(71) Applicant: Jan Wolf, Kassel (DE)

(72) Inventor: Jan Wolf, Kassel (DE)

( * ) Notice: Subject to any disclaimer, the term of this patent is extended or adjusted under 35 U.S.C. 154(b) by 62 days.

(21) Appl. No.: 17/891,167

(22) Filed: Aug. 19, 2022

(65) Prior Publication Data

US 2023/0091352 A1 Mar. 23, 2023

(30) Foreign Application Priority Data

Aug. 20, 2021 (DE) .......................... 102021121637.0

(51) Int. Cl.
*A01M 7/00* (2006.01)
(52) U.S. Cl.
CPC .................. *A01M 7/0089* (2013.01)
(58) Field of Classification Search
CPC .................. A01M 7/0089; A01M 7/0092
See application file for complete search history.

(56) References Cited

U.S. PATENT DOCUMENTS

| 10,681,905 | B2 * | 6/2020 | Tanner | A01M 21/046 |
| 10,701,852 | B2 * | 7/2020 | Calleija | A01B 39/18 |
| 10,915,087 | B2 * | 2/2021 | Aizawa | G05B 19/182 |
| 2017/0359943 | A1 * | 12/2017 | Calleija | A01B 79/005 |
| 2018/0160673 | A1 * | 6/2018 | Albert | A01M 7/00 |
| 2022/0000051 | A1 * | 1/2022 | Geltner | A01G 7/06 |

FOREIGN PATENT DOCUMENTS

| DE | 102015119026 A1 * | 5/2017 | |
| DE | 102018105631 A1 | 9/2019 | |
| EP | 1588615 A1 * | 10/2005 | A01M 21/04 |
| EP | 1588615 B1 | 6/2008 | |
| EP | 2378866 B1 * | 4/2015 | A01M 21/04 |
| EP | 3329773 A1 * | 6/2018 | A01M 21/04 |
| EP | 3302051 B1 * | 9/2019 | A01M 21/00 |
| EP | 3302052 B1 * | 10/2019 | A01B 39/18 |
| EP | 3329773 B1 | 1/2022 | |

* cited by examiner

Primary Examiner — Monica L Perry
Assistant Examiner — Aaron M Rodziwicz
(74) Attorney, Agent, or Firm — Michael Soderman

(57) ABSTRACT

An apparatus for controlling plants in a crop stand with
a) at least one liquid reservoir for receiving liquid,
b) at least one first liquid line system connected to the at least one liquid reservoir and provided with at least one controllable outlet opening controllable,
c) a recognition device for recognizing plants and communicating the position data of the plants to the control device,
d) a control device for controlling the at least one valve of the liquid line system, wherein the recognition device distinguishes plants in the crop stand between wanted plants and unwanted plants, and the control device opens the valves of the at least one first line system so as to exclusively spray the unwanted plants in the crop stand with liquid, i.e., omit the wanted plants. Unwanted plants are damaged or killed by the action of the kinetic and/or thermal energy of the liquid.

14 Claims, 2 Drawing Sheets

APPARATUS AND METHOD FOR PLANT REGULATION IN A CULTIVATED PLANT STOCK

CROSS REFERENCE TO RELATED APPLICATIONS

This application claims the priority of DE 102021121637.0 filed on 2021 Aug. 20; this application is incorporated by reference herein in its entirety.

BACKGROUND

The invention relates to an apparatus for plant control in a crop stand, said apparatus being movable over said crop stand, with at least one liquid reservoir for receiving liquid, at least one first liquid line system, which is connected to said at least one liquid reservoir and is provided with at least one outlet opening controllable via a valve, a recognition device for recognizing plants and communicating the position data of the plants to the control device, and a control device for controlling said at least one valve of the liquid line system. The recognition device is configured to distinguish plants in the crop stand between wanted plants and unwanted plants. The control device is configured to open the valves of the at least one first line system so as to exclusively spray the unwanted plants in the crop stand with liquid, i.e., omit the wanted plants. The invention further relates to a method for plant control in a crop stand, comprising the method steps of capturing a portion of the plants in a crop stand, wherein distinguishing the captured plants into wanted crop plants and other, unwanted plants, and subsequently spraying the other, unwanted plants with liquid, preferably having a high thermal and/or kinetic energy, and/or with liquid vapor, and subsequently capturing another part of the plants in a crop stand and repeating the previous method steps is performed.

In organic agricultural crop cultivation, weeds are controlled wherever possible by mechanical, thermal and biological methods, such as hoeing, weeding, flaming and observance of crop rotation. In certain cases, camera-controlled hoes are used that also work within the crop row, but their use is limited to planted crops. Particularly in densely sown, comparatively slow-growing crops such as carrots, onions and other root crops, a considerable proportion is currently still controlled by cost-intensive manual labor. Therefore, dispensing with pesticides and the resulting need for non-chemical, mechanical, thermal and, above all, manual weed control means a significant additional financial burden for organically managed farms. In conventional farming, the need for non-chemical weed control is increasing due to the decreasing number of approved herbicides and their decreasing social acceptance.

The principle of killing plants using hot water has been known for a long time and is mainly used in the field of municipal technology. Variations of this principle include weed control using hot foam and saturated steam. These systems are mainly suitable for weed control on paved surfaces (on sidewalks, roadsides, paved or graveled surfaces). Smaller systems operate with a base station that generates the hot water and a hand-held lance/distributor for hot water application. In the case of larger systems, the entire system is mounted on a small equipment carrier vehicle, which is used to move it over the surface. In the process, downward-facing outlet openings distribute the hot water across the surface and the plants.

The companies Heatweed and Waterkracht offer machines that use a camera and a simple green recognition system to distinguish vegetation from unvegetated areas. Based on this plant recognition, electrically switchable valves are controlled such that hot water is only applied to vegetated areas. This reduces the amount of water and energy required compared to a full-surface hot water application.

Apparatus and methods for weed control using hot water, also in combination with a plant recognition system that applies hot water only to vegetated areas, are already known from EP 3 329 773 A1 and EP 1 588 615 B1. Said document discloses spraying hot water onto the recognized plants, said hot water being stored in a liquid reservoir. Via a line system connected to the liquid reservoir, which is provided with a plurality of valves with controllable outlet opening, after a recognition of plants by means of a recognition device and communication of the position data of the plants to the control device takes place. The control device opens those valves of the line system that are arranged above a plant. This results in the plant being sprayed with hot water damaging the plant to such an extent that it dies. Due to this measure, it is not necessary to apply hot water to the entire area, but only to the areas vegetated by plants, making it possible to optimize the use of hot water. However, such a method with such an apparatus cannot be applied in a crop stand because the recognition device does not distinguish between wanted and unwanted plants and therefore the wanted crop plants would also be damaged or destroyed.

DE 10 2015 119 026 A1 further describes an apparatus in which the quantity of herbicides applied is reduced by applying them with pinpoint accuracy. Thermal treatment by means of flames, radiation, steam and hot water is also described. However, this has the disadvantage that thermal damage to the crop plants itself cannot be ruled out when undesirable plants in the crop stand are thermally treated. The hot liquid can spread uncontrollably after application to unwanted plants, reaching and damaging neighboring crop plants.

SUMMARY

It is therefore an object of the invention to improve an apparatus and a method for plant regulation in a crop stand in such a way that weed control is also applicable in the crop stand and damage to the crop plants is minimized.

This object is achieved by an apparatus for controlling plants in a crop stand, said apparatus being movable over said crop stand, with a) at least one liquid reservoir for receiving liquid,
b) at least one first liquid line system connected to the at least one liquid reservoir and provided with at least one outlet opening controllable via a valve,
c) a recognition device for recognizing plants and communicating the position data of the plants to the control device,
d) a control device for controlling the at least one valve of the liquid line system, wherein the recognition device is configured to distinguish plants in the crop stand between wanted plants and unwanted plants, and the control device is configured to open the valves of the at least one first line system so as to exclusively spray the unwanted plants in the crop stand with liquid, i.e., omit the wanted plants.

DETAILED DESCRIPTION

The apparatus according to the invention is configured such that unwanted plants are damaged or killed by the action of the kinetic and/or thermal energy of the liquid, the damage by the kinetic energy preferably being effected by flushing or sweeping the plant into the soil and the thermal damage being effected by application of hot liquid and/or liquid vapor having a temperature above 333 K to the unwanted plants.

Plants can be mechanically damaged by the kinetic energy of the water without the need for separate tools, such as undercutting knives, blades, rollers, trailing rakes or brushes, as described in the prior art according to DE 10 2015 119 026 A1. The principle of mechanically processing objects using the kinetic energy of water and, if necessary, an abrasive additive is known from waterjet cutting. This principle can also be used for controlling unwanted plants. Analogous to plant control using hot water, where the liquid is used as a carrier of plant-damaging thermal energy, here the liquid serves as a carrier of kinetic energy that can cause mechanical damage to plants. As with the use of hot liquid, however, there is a lack of solutions that would make it possible to apply this operating principle to crop stands.

According to the invention, the damage can be effected to the plant directly by the action of the kinetic energy of the liquid, i.e., by a high-speed water jet and possibly an abrasive additive. In particular, however, the damage is caused by the fact that plants are sweeped away by the liquid, which preferably emerges as a downward directed circular high-speed jet, and are flushed into the soil or into a hole created by the water jet. This uproots the unwanted plants, partially buries them, and cuts them off from sunlight, causing them to subsequently die or at least temporarily inhibiting their growth in a way that makes them less of a competition for the wanted plants. In this manner, the kinetic energy of the liquid can damage or kill the unwanted plants. The targeted application makes it possible to avoid inadmissibly high damage to the wanted plants.

Additionally or alternatively to damage by the action of the kinetic energy of the liquid, it has proven advantageous to thermally damage and kill unwanted plants by applying hot liquid and/or liquid vapor at a temperature above 333 K to the unwanted plants.

By applying hot liquid to the unwanted plants in a targeted manner, the unwanted plants in the crop stand can be thermally damaged and/or destroyed, so that they constitute less of a competition for the crop plants. For this purpose, a heater is preferably arranged in the at least one first line system, which heats the liquid conveyed from the liquid reservoir into the at least one first line system to a temperature above 333 K, preferably to 371 K+/−2 K.

Preferably, the recognition device detects at least one particularly vulnerable point or area per plant and communicates its position to the control device. Particularly vulnerable points are especially the growth centers and the root points, i.e., the points where the plants emerge from the soil. This allows the unwanted plants to be hit with liquid in a very targeted manner without causing damage to wanted plants. By selectively applying a liquid to the growth centers and root points forming vulnerable points, they can be irreparably damaged, causing the unwanted plant to die.

A variety of ways to apply water with pinpoint accuracy are known from the prior art in many technical fields. However, this embodiment of the invention for damaging the growth centers and root points forming vulnerable points is particularly effective for weed control in crop stands. The application to particularly vulnerable points of the plants minimizes the necessary quantity of liquid. The minimized quantity of liquid also limits the unwanted distribution of the liquid and its damaging effect, thus preventing damage to wanted plants. Therefore, application to particularly vulnerable points of the plants not only has economic advantages in terms of reduced liquid and energy use, but also allows application even closer to the crop plant, which can increase the rate of treated unwanted plants.

But even with very precise point application, the liquid can spread more or less uncontrollably immediately after application to the unwanted plants by running, splashing and seeping. If hot liquid is used, while already cool to some extent during this process, it still has enough thermal energy to damage or kill sensitive crop plants in the immediate vicinity.

Although the problem can be circumvented by applying hot water only at a sufficient distance from recognized crop plants, this also leaves a certain proportion of unwanted plants untreated.

In order to be able to apply hot liquid even closer to sensitive crop plants without inadmissibly damaging them thermally, at least one second liquid line system is preferably provided, which is connected to the at least one liquid reservoir and is provided with at least one outlet opening which can be controlled via a valve controlled via a control device. This makes it possible to effectively protect the wanted crops from damaging thermal stress. Simultaneously with or promptly upon spraying the unwanted plants with hot liquid, the wanted plants are additionally sprayed with cold liquid. If a portion of the hot liquid now reaches a crop plant due to undesirable distribution, the crop plant remains protected from thermal stress by the cold liquid applied here absorbing thermal energy of the hot liquid. This redistribution of thermal energy of the liquids effectively protects the wanted plants in the crop stand from excessive, damaging thermal stress. At the same time, the targeted application of the cold liquid to the crop plants enables the hot liquid to be applied very close to the crop plants without causing thermal damage to the crop plants themselves.

Known applications for thermal weed control apply a cooling medium only in a row-based manner, i.e., continuously in the area of the crop row. In contrast to known applications with row-related application of cold foam, cold air or spray mist for crop plant protection, the configuration of the apparatus according to the invention provides a much more effective protection, since each crop plant can be sprayed with cold liquid in a targeted and spatially very limited manner. The targeted, spatially limited application of cold liquid not only reduces the quantity to be applied, but also has less impact on the thermal treatment of unwanted plants.

Due to the recognition device being configured to recognize different plants, it is now possible to distinguish specifically between a wanted crop and an unwanted weed while moving the apparatus according to the invention. The weed can be sprayed with liquid and damaged or killed by the action of the kinetic energy of the liquid, the liquid preferably being applied only in the area of particularly vulnerable points. Preferably, however, it is sprayed with hot liquid and/or liquid vapor and thus thermally damaged in such a way that it dies. Crop plants detected in the vicinity of the weed sprayed with hot liquid are preferably sprayed with cold liquid or cold liquid mist and thus protected from thermal damage.

It has proven advantageous from an ecological and economic point of view—also with regard to organic cultivation of the crop plants dispensing with artificial fertilizers and herbicides—to use water for both the hot and cold liquids. However, aqueous solutions or ecologically harmless liquids may also be used, in case of desired mechanical damage also including an abrasive additive.

For thermal damage, it has proven advantageous that when spraying the unwanted plants or weeds, the hot liquid and/or liquid vapor has a temperature above 333 K, preferably from 368 K to 373 K, while when spraying the wanted crops at the same time, the cold liquid and/or cold liquid mist has a temperature below 333 K, preferably ambient temperature.

Generally, it is possible to carry liquid that has already been heated, but it has proven advantageous to heat the liquid to the intended temperature of, for example, 371 K+/−2 K by means of a heater arranged in the first line system and to maintain this temperature range using an integrated temperature controller. This embodiment of the invention eliminates the need for a large supply of hot liquid to be stored in the liquid reservoir. Rather, the supply of liquid can be matched to the ambient temperature, rendering a thermal insulation of the liquid reservoir obsolete.

In an embodiment involving thermal damage, the first line system serves as a hot liquid line. In said hot liquid line, liquid from the at least one liquid reservoir, which acts as a storage vessel and in which the liquid is at ambient temperature for reasons of simplicity, is fed to the heater, in which the liquid is heated to the intended temperature. From said heater, the liquid is conducted to the least one valve. Liquid that is not discharged through the valve is preferably pumped back to the heater to constantly provide hot water at the valves. The at least one valve is connected to one or more outlet openings, which are preferably arranged in a row above the weed and crop plant area to be treated. At least one liquid-carrying component between the at least one valve and the associated outlet opening, which conducts the liquid from the valve to the outlet opening, is preferably preheated by a heat-conducting connection to the hot liquid in the first line system to minimize cooling of the liquid before it exits the outlet opening. In a particularly advantageous embodiment, the component is preheated by being in direct contact with the liquid of the first line system, e.g. by having the hot liquid of the first line system flow through or around it.

The overall system is moved over the surface, and in an advantageous embodiment the outlet openings are arranged transversely to the direction of motion and directed toward the surface, preferably vertically downward. If an outlet opening is located above or near a weed plant, the corresponding valve opens—or if there is only one valve, it is moved to the corresponding position before opening—and applies a quantity of liquid, preferably a quantity of hot water, to the plant, causing it to die immediately or to be damaged to such an extent that it subsequently dies. The valves are controlled based on a recognition device that recognizes plants and distinguishes unwanted plants, or weeds, from the wanted crop plants.

Preferably, cold liquid from the reservoir is conducted directly to the at least one valve of the second line system. This valve is also connected to one or more respective outlet openings. The outlet openings for cold water are preferably likewise arranged in a row transverse to the direction of motion or, in the case of only one valve, movable transversely to the direction of motion, are directed toward the surface and are arranged in the vicinity of the outlet openings for hot water, preferably behind the latter in the direction of motion. If a crop plant is located below one or more outlet openings, the corresponding valves open and apply a quantity of cold water to the crop plant to protect it from thermal damage caused by the hot water applied nearby.

Generally, the valves of the line systems do not have to be arranged transversely to the direction of motion of the apparatus according to the invention or, in the case of one valve in a line system, it does not have to be movable transversely to said direction. Other arrangements are conceivable as well. Also, the outlet openings may be configured as swiveling nozzles that can be controlled via the control device.

A particular advantage of the apparatus according to the invention is that both hot and cold liquid can be applied with millimeter precision, thus selectively destroying unwanted plants while protecting wanted crop plants even if they are growing only a few millimeters apart. The configuration with multiple valves arranged transversely to the direction of motion has the advantage that higher operating speeds of the overall system are possible than with only one valve whose outlet opening is moved or swiveled to the corresponding position.

The preferred valves are solenoid valves, which ensure high precision in the application of the liquid to the plants due to switching times in the millisecond range, even at increased motion speeds of the apparatus.

The apparatus is preferably moved over the surface at a speed of 0.1-10 km/h, more preferably at 0.5-5 km/h. In this case, the at least one outlet opening is preferably guided above the surface at a distance of up to 50 cm, particularly preferably at a distance of 3 cm to 30 cm. Preferably, the part of the apparatus including the outlet openings is height-adjustable for this purpose, and especially preferably this height adjustment or height stabilization takes place automatically.

To accurately hit the plants with the liquid, a uniform, low-vibration motion of the apparatus, or the part including the outlet opening and preferably also the camera, is advantageous. Therefore, this part is preferably mounted in a vibration-damping manner.

Vibrations transverse to the direction of motion are preferably prevented or minimized by at least one cutting disc running in the soil. Variants of this vibration suppression consist in at least a simple wheel or also a cutting element running in the soil, such as a vertically arranged blade.

According to an advantageous embodiment of the invention, the at least one first line system with the heater is configured as a circulation system, the lines between the heater and the valves preferably being thermally insulated. The circulation line allows the hot liquid to be circulated between the at least one valve and the heater to constantly provide hot water at the at least one valve. In order to be able to continuously convey the hot liquid in this circuit at a constant temperature, a circulation pump is advantageously arranged in the circulation system.

The heater is preferably configured as a continuous-flow gas heater operated with propane gas. By means of the continuous-flow gas heater and a temperature controller, it is easily possible to keep the hot liquid at a relatively constant temperature of, for example, 371 K+/−2 K. This embodiment of the invention eliminates the need for a large supply of hot liquid to be stored in the liquid reservoir. Rather, the supply of liquid can be matched to the ambient temperature, rendering a thermal insulation of the liquid reservoir obsolete.

Generally, it is possible to keep the liquid reservoir pressurized in order to convey the liquid into the two line systems. However, such a liquid reservoir must then also be pressure-tight. Alternatively, however, it is also possible for a respective feed pump to be arranged in each of the at least one first line system and the at least one second line system for conveying liquid from the liquid reservoir into the line systems. This embodiment makes it possible to use a liquid reservoir that does not need to be pressure-tight. Alternatively, it is possible to use a common feed pump for both line systems.

According to a particularly advantageous embodiment of the invention, the recognition device for recognizing different plants has at least one sensor, in particular an optical sensor, or a camera for detecting electromagnetic waves. In particular, electromagnetic waves in the visible or infrared range should be detectable in this case. This makes it possible to detect and distinguish the plants in the crop stand, so that unwanted plants or weeds can be mechanically and/or thermally treated or destroyed, while the wanted crops are protected from thermal stress by applying cold liquid.

In this regard, it has proven advantageous that the area captured by the camera is artificially illuminated and preferably shielded from direct sunlight by means of a shading device. This allows the camera to provide image data with consistent quality and appearance even under changing environmental and lighting conditions (day/night, sunny/cloudy), which is advantageous for reliable recognition. Preferably, the camera is arranged in the direction of motion in front of the at least one liquid outlet.

To accurately distinguish between plants in the crop stand, the recognition device preferably includes at least one artificial neural network. Said network has preferably been trained with the aid of an extensive image database to recognize wanted and unwanted plants, to distinguish them from one another and, in a particularly advantageous embodiment, to detect particularly vulnerable points of the plants and to transfer their positions to the control device. In particular, the detection of the growth center as well as the root point, i.e., the point at which a plant emerges from the soil, is advantageous in this case. A recognition device trained in advance in this manner thus does not require access to an (image) database during operation in order to perform recognition.

To determine the position of the recognized plants or points as accurately as possible, the camera or an additional sensor also detects the distance from the soil or plants. In a particularly advantageous embodiment, the camera is configured as a 3D camera or depth camera, which enables simple conversion of the image points into coordinate points.

For accurate application of the liquid while moving, i.e., while the device is being moved over the surface, it is advantageous for the control device to know the relative position of the apparatus and/or its motion or speed. In combination with the position data of the recognized plants, the control device can thus determine the times for opening (and closing) the valve(s). This is especially true if the recognition device requires a certain time interval for recognition in which the apparatus has already been significantly moved on.

In the simplest form, the speed of motion of the apparatus is kept constant and set or programmed as a fixed value in the control device. However, it is more advantageous if the recognition or control device acquires the motion or speed data itself; in this manner, the system can operate accurately even in the case of variable speeds and non-uniform motion.

For determining the motion data, it has proven advantageous for the control device to calculate the motion data of the apparatus directly from the image data of one or more cameras. For this purpose, the overlap of successively captured images is preferably determined, from which, in combination with the time interval between the images, the speed of motion can be calculated. Additionally or alternatively to determining the motion data from the image data, it is advantageous for the apparatus to have a GPS sensor which communicates with the control device. Alternatively or additionally, another sensor may be used to acquire the motion or speed. This allows accurate motion or speed determination for precise hot and cold liquid application as the apparatus moves over the crop stand.

A variation of liquid application with the apparatus according to the invention consists in a full-surface application of hot liquid, wherein the positions or areas where wanted plants are located are specifically omitted and preferably protected with cold liquid. While this variation has the disadvantage that it means a significantly higher energy and liquid consumption, it is advantageous in that the all-over application also kills unwanted plants that are not captured by the recognition device. These may include, for example, very small plants that do not yet or barely emerge from the soil surface, or plants that are not detected due to their size or structure.

In an advantageous embodiment of the invention, the apparatus according to the invention is configured as a trailed apparatus or attachment for an agricultural vehicle, so that it does not need to be self-propelled.

Alternatively, however, it is possible for the apparatus according to the invention to be configured as an independent, self-propelled vehicle. In such an embodiment of the invention, the apparatus may also be able to operate autonomously without the need for operating personnel to be on site.

Furthermore, according to one embodiment of the invention, the apparatus according to the invention has a self-sufficient power supply, in particular for the artificial lighting, the pumps and the electronics of the recognition and control device. This can also be advantageous when the apparatus according to the invention is configured as a trailed apparatus or attachment for an agricultural vehicle, since its generator often lacks the corresponding power.

The object of the invention is further achieved by a method for plant control in a crop stand, comprising the following method steps:
  i capturing a portion of the plants in a crop stand, wherein
  ii distinguishing the captured plants between wanted crop plants and other, unwanted plants, and subsequently
  iii spraying the other, unwanted plants with liquid, preferably having a high thermal and/or kinetic energy, and/or liquid vapor, and subsequently
  iv capturing a further portion of the plants in a crop stand and repeating method steps i to iv takes place.

The method according to the invention for plant control in a crop stand is characterized in that unwanted plants are damaged or killed by the action of the kinetic and/or thermal energy of the liquid, the damage by the action of the kinetic energy preferably being effected by flushing or sweeping the plant into the soil and the thermal damage being effected by hot liquid and/or liquid vapor having a temperature above 333 K.

In a particularly advantageous embodiment, spraying of the wanted crop plants with cold liquid and/or cold liquid mist is performed simultaneously with or promptly upon spraying of the unwanted plants with liquid having a high thermal and/or kinetic energy or liquid vapor, which protects the wanted plants from thermal damage. This second liquid and/or liquid mist, which has a temperature below 333 K, and preferably ambient temperature, preferably has a low kinetic energy, so that the crop plant is not damaged.

Further objects, advantages, features and possible applications of the present invention will be apparent from the following description of embodiment examples with reference to the drawings. In this regard, all the features described and/or illustrated constitute, individually or in any reasonable combination, the subject matter of the present invention, also irrespective of their combination in the claims or their dependency.

DETAILED DESCRIPTION OF THE PREFERRED EMBODIMENTS

Figure 1:
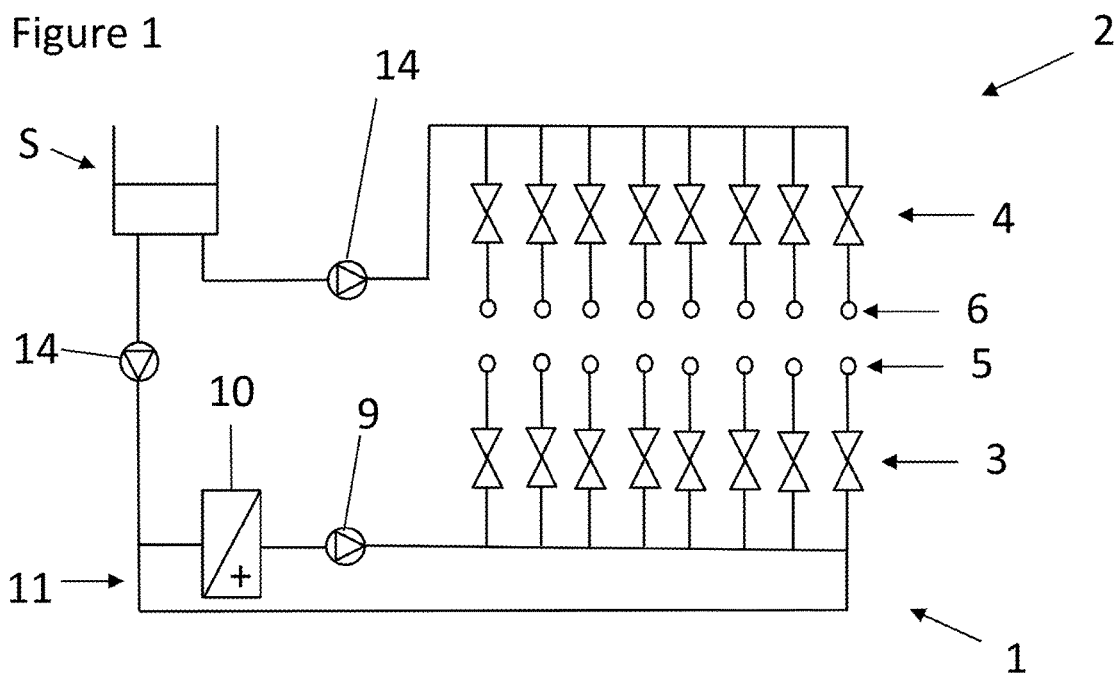
FIG. 1: is a schematic representation of an example embodiment of an apparatus according to the invention.

FIG. 1 shows an embodiment example of the entire fluid system of an apparatus according to the invention for plant control in a crop stand, said apparatus being movable over the crop stand. In the embodiment example of FIG. 1, the apparatus is configured for application of hot liquid and cold liquid. For this purpose, the apparatus has a liquid reservoir S in which the liquid to be applied to the plants—in the simplest case water—is stored. A first liquid line system 1 is connected to the liquid reservoir S, which is provided with outlet openings 5 that can be controlled via valves 3. Via this first line system 1, liquid at ambient temperature is conveyed from the liquid reservoir S to a circulation system 11 of the first line system 1 by means of a feed pump 14. In the circulation system 11, a heater 10 in the form of a propane gas-powered continuous-flow gas heater is arranged, downstream of which a circulation pump 9 is connected. In the heater 10, the liquid conveyed by means of the feed pump 14 is heated to a temperature of 371 K+/−2 K and is conveyed to the valves 3 of the line system 1 via the circulation pump 9. When these valves 3 are in their closed position, the heated liquid circulates continuously in the circulation system 11 of the first line system 1, being reheated in the heater 10—if necessary—to the desired temperature if the liquid in the circulation system 11 has cooled down in the meantime.

A second line system 2 is also connected to the liquid reservoir S, which is also provided with a feed pump 14 that conveys the liquid in the liquid reservoir S, which is at ambient temperature, to valves 4 of the second line system 2. If the valves 4 are closed, no liquid is conveyed by the feed pump 14 of the second line system 2. However, if at least one valve 4 of the second line system 2 is open, the liquid having ambient temperature is discharged via an outlet opening 6 of the respective open valve 4.

Said opening and closing of the valves 3 and 4, which are preferably configured as solenoid valves, are in this case performed by a control device not shown in FIG. 1. The control device in this case receives data from a recognition device for recognizing plants, which is also not shown in FIG. 1. The recognition device is configured such that it can distinguish between different plants. In particular, it can distinguish between a plant that is wanted in the crop stand and plants that are not wanted, and can preferably recognize particularly vulnerable points such as a growth center and/or a root point 20. If an unwanted plant is detected, the position of the unwanted plant is communicated to the control device, which then opens the corresponding valve 3 of the first line system 1 as the apparatus is moved over this unwanted plant, and thus applies hot liquid, in particular hot water, to this unwanted plant via the outlet opening 5. By applying or spraying the liquid at about 371 K onto this unwanted plant, the plant is damaged in such a way that it dies or develops much more slowly as a result of the application of this thermal energy. If the recognition device has detected plants in the vicinity of the plant being sprayed with hot liquid that are wanted in the crop stand, the respective valve 4 of the line system 2 is also opened by the control device, so that cold liquid, in particular water at ambient temperature, can be applied over this plant. Through this application of cold water or cold liquid, the respective wanted plant is protected from thermal damage that can occur due to running and/or splashing hot water or hot liquid.

Figure 2:
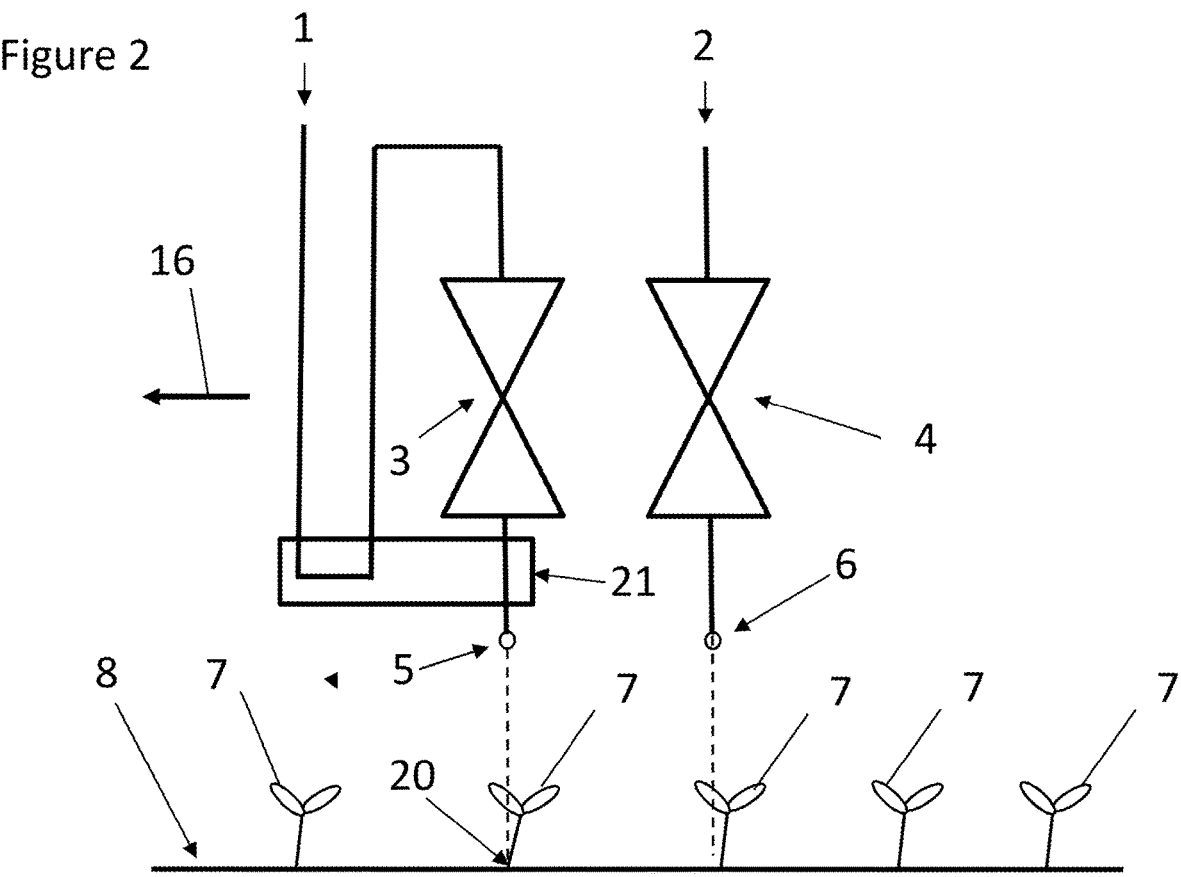
FIG. 2: is a schematic detailed view of the apparatus according to FIG. 1, FIG. 3: is a perspective representation of a detail of an apparatus according to the invention.

FIG. 2 shows a detailed view of the apparatus according to FIG. 1, with a valve 3 and an outlet opening 5 of the first line system 1 for hot liquid application and a valve 4 with an outlet opening 6 of the second line system for cold liquid application. The apparatus is moved over a soil surface 8 provided with plants 7, 7', in the direction of arrow 16. If one of the plants 7 is detected as an unwanted plant 7' in the crop stand, the valve 3 of the liquid system 1 opens and applies hot liquid to this plant 7' or preferably to its root point 20 via the outlet opening 5. If, at the same time, the recognition device detects a wanted plant 7 in the vicinity of this unwanted plant 7' to which hot liquid is applied, the control device, which is also not shown in FIG. 2, opens the valve 4 of the line system 2, so that cold liquid can be applied to this plant 7 via the outlet opening 6, thus protecting it from thermal stress caused by splashing or running hot liquid, which was applied to the unwanted plant 7' by the first line system 1. The preheating of the liquid-carrying component 21 between the valve 3 and the outlet opening 5 by the liquid in the first line system 1, which is achieved by passing the latter through the component 21, can also be seen here. This minimizes cooling of the liquid before it exits the apparatus.

Figure 3:
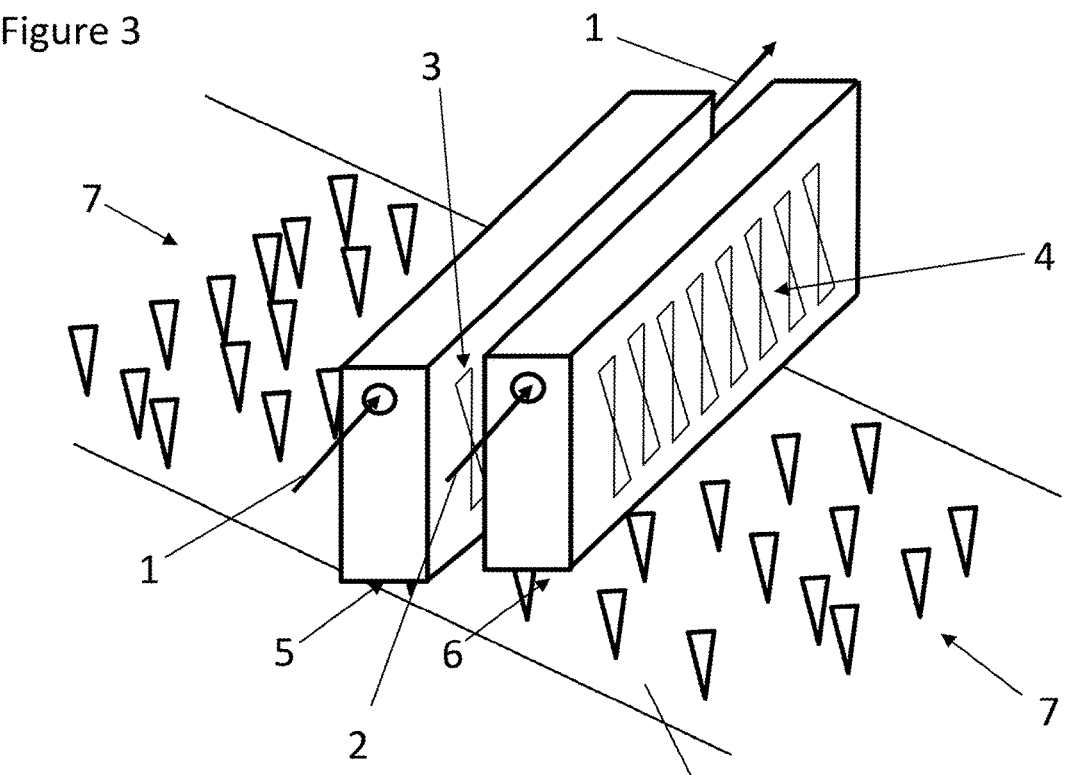

In FIG. 3, the situation according to FIG. 2 is shown again in perspective. In this case, multiple valves 3 and 4 with corresponding outlet openings 5 and 6 are arranged both in the first line system 1 for hot liquid and in the line system 2 for cold liquid. The outlet openings 5 and 6 can also be swiveled, if necessary, by means of the control unit, which is again not shown here, so that a very precise application, i.e., in the millimeter range, of both the hot and the cold liquid to the plant 7, 7' selected by the control unit can be performed.

Figure 4:
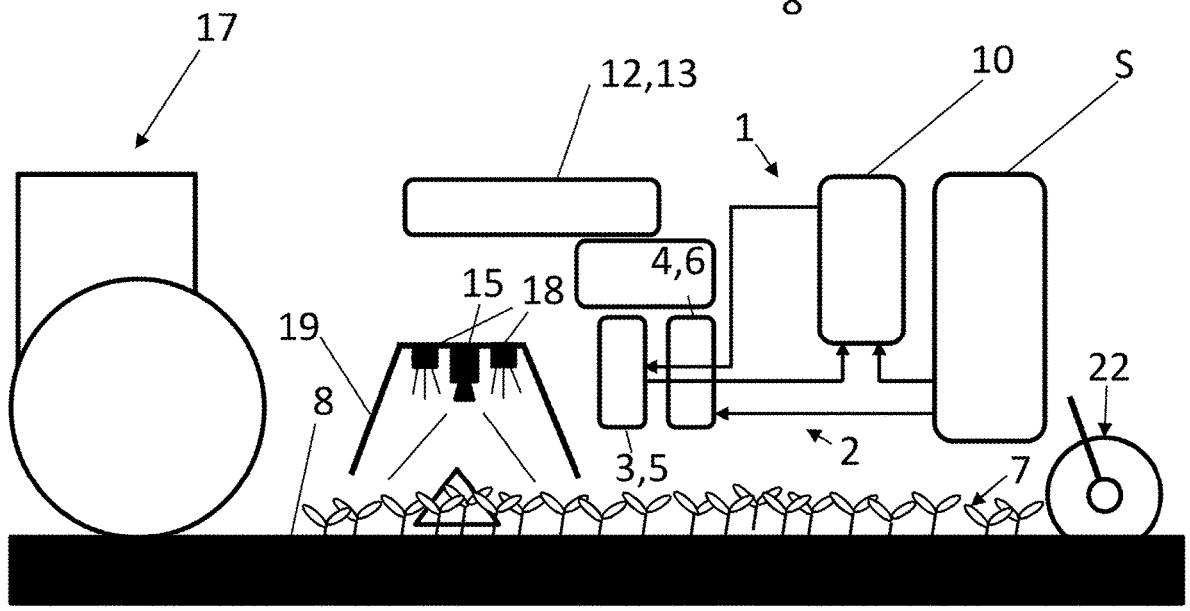
FIG. 4: is a schematic representation of a further embodiment example of an apparatus according to the invention.

FIG. 4 schematically shows an embodiment example of an apparatus according to the invention as an overall system in the form of an attachment or trailed implement that can be coupled to a tractor 17. By means of the tractor 17, the entire apparatus is moved over a crop stand. During this process, a recognition device 12 recognizes the plants 7 growing on the soil surface 8. The recognition is preferably performed by a camera 15, which may be configured as a 3D camera, and, if necessary, also by an infrared camera. For better detection of the plants located on the soil surface 8, the embodiment example of FIG. 4 also has lighting devices 18 by means of which the soil surface 8 captured by the camera 15 is illuminated, as well as a shading device 19 which shields the area captured by the camera 15 from incident sunlight. The camera data is then communicated to a recognition device 12, which uses an integrated artificial neural network to distinguish the plants between wanted plants 7 and unwanted plants 7' in the crop stand on the soil surface 8 and detect the position of their root points 20. If the recognition device 12 identifies an unwanted plant 7' on the soil surface 8, the control device 13 opens the corresponding valve 3 when it is above or near the unwanted plant 7'. The position data is in this case communicated from the recognition device 12 to the control device 13. At the same time, speed data is calculated from the overlap of successive images from the camera 15 and matched with data from a GPS or other sensor for motion, speed and/or position detection for even greater accuracy. The control device 13 determines the time to open (and close) one or more corresponding valves 3 of the first line system 1 from the combination of the position data of the plant 7' with motion or speed data of the apparatus, taking into account the switching times of the valves 3 and the time required for the liquid from the outlet opening 5 until hitting the plant 7' or the surface. The valves 3 of the first line system are opened via corresponding control signals of the control device 13. If the recognition device 12 has identified wanted plants 7 in the crop stand in the immediate vicinity of the unwanted plant 7' being damaged or destroyed with hot water, the control device opens corresponding valves 4 of the second line system 2 in order to protect these plants 7 from running or splashing hot liquid of the hot liquid application and thus from thermal damage. The determination of the times for opening and closing the valves 4, i.e., the cold water valves, is done in a similar manner as for those of the hot water system.

A cutting disc 22 running in the soil minimizes vibrations and motions transverse to the direction of motion of the apparatus. For a particularly uniform, low-vibration motion at a constant distance above the surface, the part of the apparatus including the camera 15 and the outlet openings 5, 6 is further mounted in a height-adjustable and vibration-damped manner (not shown). The height adjustment is in this case performed automatically based on the distance from the soil surface 8 as determined by the 3D camera.

It can be clearly seen in FIG. 4 that both the first line system 1 and the second line system 2 are fed from the same liquid reservoir S. The second line system 2 is supplied directly with liquid at ambient temperature, while in the first line system 1 a heater 10 in the form of a propane gas-powered continuous-flow gas heater is arranged between the liquid reservoir S and the valves 3, which heats the liquid stored in the liquid reservoir S to a temperature of approx. 371 K+/−2 K. As can also be clearly seen in the illustration of FIG. 4, the first line system for application of hot liquid has a circulation system 11. Said system serves to ensure that when the valves 3 of the first line system 1 are closed, the heated liquid does not need to be returned to the large liquid reservoir S, but the hot liquid in the circulation system only needs to be minimally reheated by the flow heater repeatedly in order to maintain the temperature required for application. If the liquid were returned to the large liquid reservoir S, this would result in a significant loss of energy, as the heated liquid would then be cooled back down to near ambient temperature.

LIST OF REFERENCE NUMERALS

S liquid reservoir
1 first line system
2 second line system
3 valve
4 valve
5 outlet opening
6 outlet opening
7 wanted plant, crop plant
7' unwanted plant
8 soil surface
9 circulation pump
10 heater
11 circulation system
12 recognition device
13 control device
14 feed pump
15 camera
16 arrow
17 tractor
18 lighting device
19 shading device
20 root point
21 liquid-carrying component
22 cutting disc

The invention claimed is:

1. An apparatus for controlling plants in a crop stand, said apparatus being movable over said crop stand, comprising
   a) at least one liquid reservoir(S) for receiving liquid,
   b) at least one first liquid line system (1) connected to the at least one liquid reservoir(S) and provided with at least one outlet opening (5) controllable via a valve (3),
   c) a recognition device (12) for recognizing plants (7, 7'), said recognition device having at least one sensor, an optical sensor, or a camera for detecting electromagnetic waves in the visible or infrared range, and communicating position data of the plants (7, 7') to a control device (13),
   d) the control device (13) for controlling the at least one valve (3) of the first liquid line system (1),
   wherein
   the recognition device is configured to distinguish plants in the crop stand between wanted plants (7) and unwanted plants (7'), and
   the control device (13) is configured to open the valves (3) of the at least one first line system (1) so as to exclusively spray the unwanted plants (7') in the crop stand with liquid, omitting the wanted plants (7), wherein
   unwanted plants (7') are damaged or killed by an action of kinetic and/or thermal energy of the liquid,
   characterized in that
   at least one second liquid line system (2) is provided which is connected to the at least one liquid reservoir (S) and which is provided with at least one outlet opening (6) which is controlled via a valve (4) controlled via a control device (12), wherein a heater (10) for heating liquid conveyed from the liquid reservoir(S) into the at least one first line system (1) is arranged in the at least one first line system (1).

2. The apparatus according to claim 1, wherein the recognition device (12) is configured to detect at least one particularly vulnerable point or area per plant (7'), to detect the growth center and/or the root point (20), the point at which the plant (7') emerges from the soil.

3. The apparatus according to claim 1, wherein the at least one first line system (1) with the heater (10) is configured as a circulation system (11), wherein a circulation pump (9) is arranged in the circulation system (11) and the lines between the heater (10) and the valves (3) are thermally insulated.

4. The apparatus according to claim 1, wherein at least one liquid-carrying component (21) between the valve (3) and the outlet opening (5) is preheated by the hot liquid in the at least first line system (1) by this component (21) being connected to a part of the first line system (1) in a heat-conducting manner, and by hot liquid flowing directly through or around the component (21).

5. The apparatus according to claim 1, wherein the recognition device detects the distance from the soil surface (8) and/or the plants (7, 7'), by at least one camera (15) being configured as a 3D camera.

6. The apparatus according to claim 1, wherein the control device (13) detects the motion or speed of the apparatus by determining the motion from the overlapping images of at least one camera (15) and/or by having GPS sensor, in communication with the control device (13).

7. The apparatus according to claim 1, wherein the recognition device (12) includes at least one artificial neural network which has been trained with the aid of an image database.

8. The apparatus according to claim 1, wherein motions or vibrations of the apparatus transverse to the main direction of motion are minimized by at least one wheel with positive soil contact preferably a cutting wheel or cutting disc (22) immersed in the soil.

9. The apparatus according to claim 1, wherein motions or vibrations of the apparatus transverse to the main direction of motion are minimized by at least one element cutting through the soil, a vertically arranged blade partially immersed in the soil.

10. The apparatus according to claim 1, wherein the liquid emerges as a circular jet.

11. The apparatus according to claim 1, wherein the at least one outlet opening (5, 6) is moved over the soil surface (8) at a distance of 3 cm to 30 cm.

12. The apparatus according to claim 1, wherein the recognition device (12) is configured to detect at least one position datum of the plants (7, 7') via the camera or an additional sensor detects the distance from the soil or plants, which enables simple conversion of the image points into coordinate points.

13. The apparatus according to claim 1, wherein the damage by the kinetic energy being effected by flushing or sweeping the plant (7') into the soil and the thermal damage being effected by application of hot liquid and/or liquid vapor having a temperature above 333 K to the unwanted plants (7').

14. A method for plant control in a crop stand, comprising the following method steps:
  i capturing a portion of the plants (7, 7') in a crop stand, wherein
  ii distinguishing the captured plants (7, 7') between wanted crop plants (7) and other, unwanted plants (7'), and subsequently
  iii spraying the other, unwanted plants (7') with liquid having a high thermal and/or kinetic energy, and/or liquid vapor, and subsequently
  iv capturing a further portion of the plants (7, 7') in a crop stand and repeating method steps i to iv, wherein unwanted plants (7') are damaged or killed by an action of thermal and/or kinetic energy of the liquid, the damage by the action of kinetic energy and the thermal damage being effected by hot liquid and/or liquid vapor having a temperature above 333 K,
characterized in that
spraying of the wanted crop plants (7) with cold liquid having a temperature below 333 K having a low kinetic energy and/or with cold liquid mist is performed simultaneously with or promptly upon spraying of the other, unwanted plants (7') with liquid having a high thermal and/or kinetic energy and/or with liquid vapor.

* * * * *